United States Patent [19]

Hendrix

[11] Patent Number: 4,655,937
[45] Date of Patent: Apr. 7, 1987

[54] ROTARY DRUM VACUUM FILTER FOR EASILY ERODED CAKES

[75] Inventor: David C. Hendrix, Lake Jackson, Tex.

[73] Assignee: BASF Corporation, Wyandotte, Mich.

[21] Appl. No.: 715,688

[22] Filed: Mar. 25, 1985

Related U.S. Application Data

[63] Continuation of Ser. No. 594,501, Mar. 29, 1984, abandoned.

[51] Int. Cl.⁴ .................... B01D 33/08; B01D 33/36
[52] U.S. Cl. ................................ 210/772; 210/784; 210/217; 210/391; 210/402
[58] Field of Search ............... 210/772, 784, 391, 392, 210/393, 396, 397, 402, 403, 404, 406, 217; 162/310, 327

[56] References Cited

U.S. PATENT DOCUMENTS

| | | | |
|---|---|---|---|
| 1,280,439 | 10/1918 | Genter | 210/772 |
| 1,914,742 | 6/1933 | Hillier | 210/393 |
| 2,202,932 | 6/1940 | Tingey | 210/217 |
| 2,525,135 | 10/1950 | Huff | 210/402 |
| 2,741,369 | 4/1956 | Fest | 210/217 |
| 2,753,766 | 7/1956 | Simpson | 210/217 |
| 2,812,065 | 11/1957 | Wilson | 210/393 |
| 3,729,414 | 4/1973 | Harris | 210/217 |
| 4,008,154 | 2/1977 | Richards | 210/217 |
| 4,121,968 | 10/1978 | Wells | 210/217 |
| 4,136,031 | 1/1979 | Jakobsen | 210/402 |

FOREIGN PATENT DOCUMENTS 2039292 2/1972 Fed. Rep. of Germany ...... 210/402

Primary Examiner—Ernest G. Therkorn
Attorney, Agent, or Firm—Rupert B. Hurley, Jr.; Joseph D. Michaels

[57] ABSTRACT

Disclosed is an improved rotary drum vacuum filter that is especially useful in the filtration of particulates that form an easily eroded cake. The improved filter utilizes sprayers and a spray blocking means to achieve an unexpectedly efficient rinse of the cake.

16 Claims, 5 Drawing Figures

ROTARY DRUM VACUUM FILTER FOR EASILY ERODED CAKES

This a continuation of co-pending Ser. No. 06/594,501 filed Mar. 29, 1984, now abandoned.

BACKGROUND OF THE INVENTION

1. Field of the Invention

The present invention pertains to the field of liquid purification or separation, more specifically the separation of suspended solids from a liquid. The method and apparatus of the invention comprise the direct application of the suspension to the filter medium. The filter medium is moving, as the filter medium is in the form of a rotating drum. More specifically, the invention is concerned with an improved rotary drum vacuum filter, wherein the improved filter enables a high degree of particulate rising of easily eroded particulates, such as small catalyst particulates having a relatively high surface area per unit weight, or other finely divided particles.

2. Description of the Prior Art

Applicant is aware of the existence of many prior art U.S. patents relating to rotary drum vacuum filters. However, applicant believes that U.S. Pat. No. 4,008,154 is closer to the present invention than any other prior art of which applicant is aware. Accordingly, the relationship of the present invention to U.S. Pat. No. 4,008,154 is discussed immediately below in detail. Other more distantly related prior art includes the following U.S. Pat. Nos.: 3,729,414; 3,215,277; 2,698,687; 2,092,111; and 1,475,244. Applicant does not believe that any of these other prior art patents are close enough to the instant invention to be worthy of any detailed discussion.

U.S. Pat. No. 4,008,154 discloses a process and apparatus for rinsing a cake formed on a rotary drum vacuum filter. The apparatus has:

". . . at least one elongated hollow distributor pipe mounted radially outward of and above said drum . . . said pipe having a multiplicity of uniformly spaced axially aligned holes . . . disposed on said pipe . . ." (claim 1)

In contrast, the instant invention utilizes no such distributor pipe. Furthermore, the '154 patent teaches that the:

"Wash liquid passes into the main distributor pipe 15 under pressure and then jets out at relatively high velocity through the . . . holes 15a . . . In a typical . . . application these holes . . . are . . . directed away from the filter cake." (column 4 ll. 27-38)

In contrast, the instant invention utilizes sprayers for rinsing the filter cake, the sprayers being directed *towards* the cake. However, the '154 patent even teaches away from the use of sprayers in the filtration device:

"Such filters can also be provided with spray nozzles mounted on distributor pipes. Since spray nozzles create relatively high velocity sprays, reasonably even distribution of liquid is possible at the outlet of the spray nozzles. However, the high velocities with which the spray issues have detrimental effects on the cake porosity and are undesirable. At the same time wash rates can vary widely depending on the nature of the wax crystals. When this occurs, the shape of the spray will change with the liquid pressure and coverage by the spray nozzles will be dependent upon the wash rate. Accordingly, at low wash rates poor coverage of the cake and poor washing often occurs." (Col. 2 ll. 22-34)

Instead of impinging spray directly on the cake, the '154 patent drips the rinsing fluid down onto the filter cake, the rinsing fluid initially running off of the redistribution wire 18 as a small continuous stream, the stream breaking up into droplets before reaching the filter cake which is ordinarily about 4-8 inches below (col. 5 ll. 28-35 of the '154 patent). In contrast, the instant invention blocks at least part of the spray with a spray blocking means, the blocking means being positioned above the cake surface, the blocking means being separated from the cake surface by a maximum of two inches.

The '154 patent requires a "diffusion channel" and a "redistributing overwrap means". The instant invention utilizes no similar elements.

BRIEF SUMMARY OF THE INVENTION

The present invention is concerned with an improved rotary drum vacuum filter which is especially useful in the filtration and rinsing of particulates which are easily eroded by a rinsing fluid. The improved filter is of the type which has a filter drum having a filter medium thereon, a means to rotate the filter drum, a means to create a vacuum within the filter drum, a means to partially submerge the filter drum within a suspension which contains particulates which are to be removed, a spray rinsing means for rinsing the particulate cake which is formed on the filter medium, and means to eject rinsed particulates from the filter medium. The improvement found in the filter of the invention lies in a means to block a portion of the spray rinse with a spray blocking means which is above the cake surface. The blocking means is separated from the cake surface, but by a maximum distance of only two inches.

It is an object of the present invention to filter and rinse easily eroded particulates with a rotary drum vacuum filter without eroding the filter cake.

It is another object of the invention to use a rotary drum vacuum filter to rinse fragile, easily eroded, or otherwise sensitive particulates more thoroughly than has been permitted by prior art rotary drum filters.

It is another object of the present invention to utilize less rinse water in achieving a desired degree of rinsing of particulates being separated from a liquid in a rotary drum vacuum filter.

DETAILED DESCRIPTION OF THE PREFERRED EMBODIMENTS

U.S. Pat. Nos. 3,729,414 and 2,092,111 illustrate the general arrangement of a rotary drum vacuum filter, these two patents being hereby incorporated by reference. The figures included in the instant specification emphasize those portions of the filter which are important to the instant invention. The remainder of the filter was excluded from the figures for ease of comprehension and illustration.

Figure 1A:
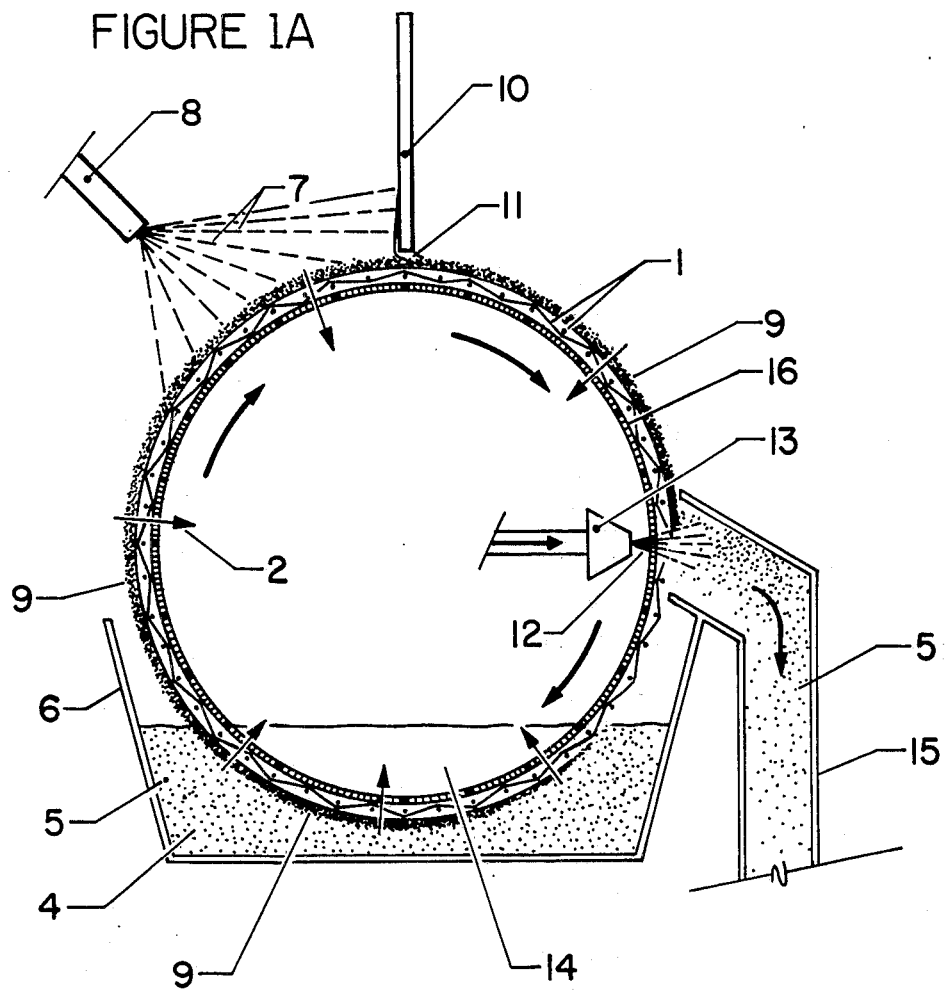
FIG. 1A is a cross-sectional frontal view of a portion of an improved rotary drum vacuum filter of the present invention.

FIG. 1A illustrates the most complete view of the present invention. FIG. 1A illustrates many features common to most rotary drum vacuum filters. A rotary drum (16) is revolved clockwise by a motor (not shown). The rotary drum (16) supports a screen (1), the screen acting as the filter medium (1). Both the screen (1) and supporting structure (16) are permeable to water and air due to a multiplicity of passageways therethrough. The drum (16) has a vacuum applied thereto by a vacuum pump (not shown). The six radial direction indicating arrows (2) illustrate the movement of fluid and gas through the drum (16) and the screen (1), this movement being caused by the vacuum within the drum. The drum (16) is partially immersed in an open container (6) containing liquid (4) having particulates (5) therein. The vacuum within the drum pulls both liquid (4) and air through the filter medium (1) towards the vacuum pump (not shown). The liquid filtrate (14) is drawn out of the drum, and towards a second vacuum pump, by a pipe (not shown) connected to the second pump. As the liquid (4) travels through the filter medium (1), particulates (5) within the liquid (4) are pulled against, and held against, the filter medium (1) as a result of the inward flow of liquid (4). The particulates (5) form a cake (9) on the surface of the filter medium (1). As a given point on the surface of the drum rotates through the liquid and emerges from the liquid, particulates are held on the surface of the filter medium (1). These still "wet" particulates rise out of the liquid as a cake (9) and are then held on the surface of the filter medium by airflow, along with possible attractive forces between the filter medium and the particulates (depending on the materials present), and the surface tension created by the liquid remaining on the particulates (again, depending on the materials present). As the drum continues to rotate the cake (9) is subjected to a rinse spray (7) emitted from a spray jet (8). The rinse liquid, most preferrably in the form of atomized spray, impinges upon the cake (9) and thereby dilutes any residual liquid (4) remaining on the cake (9). As the cake (9) travels clockwise upward, it is continuously subjected to the spray until it reaches its highest point on its rotational path of travel. At this "peak", the cake is two inches or less (but remains separated) from the lowermost portion of a spray blocking means. The spray blocking means is most preferrably a continuous vertical wall (10), the wall being high enough to catch the highest portion of the spray (7), and long enough to extend the full length of the drum (1). The spray strikes the wall (10) and runs down into the particulate layer (9), herein termed the particulate cake (9). The portion of the spray (7) which strikes the wall forms a steam (11) which travels from the bottom of the wall (10), the stream (11) traveling onto the cake (9) surface as can be easily seen in FIG. 1B, the stream (11) creating a region of very heavy rinse compared to the direct spray (7). By contacting the cake (9) on the "peak" of the drum, the stream (11) is pulled directly downward with virtually no flow parallel to the surface of the cake. This process creates very little tendency for erosion of the particulates. Once rinsed, the cake (9) continues to revolve clockwise until it reaches about "3 o'clock", at which point the particulates forming the cake (9) are ejected by a jet of air (12), the jet of air being emitted by a jet nozzle (13). The jet nozzle is supplied with compressed air. The jet nozzle (13) is positioned inside the drum, and the jet of air (12) emitted is directed radially outward through the drum (1). The jet of air (12) blows particulates off of the surface of the screen (1), thereby disintegrating the cake (9).

Once ejected, the particulates (5) are blown into a chute (15) which guides them to a desired location (not shown), such as a hopper, a dryer, etc.

Figure 1B:
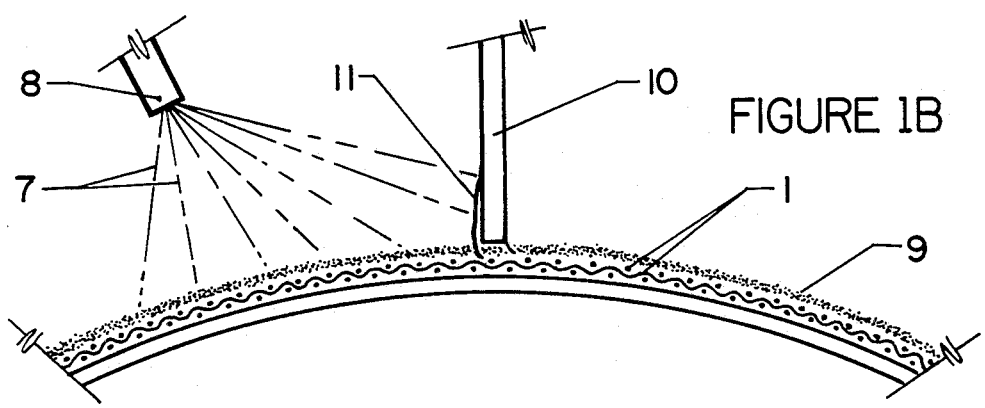
FIG. 1B is a close-up view of a portion of FIG. 1A.

FIG. 1B illustrates a close-up view of FIG. 1A, this close-up view focusing on the "peak" of the drum and on the spray blocking wall (10). Note the flow of blocked spray down the wall, and the stream (11) traveling onto the cake (9). The stream (11) may form droplets or may be a steady, continuous, substantially uniform flow. Whether the stream (11) "drips" or "flows" depends upon, among other things:

(a) the distance from the cake to the wall; and
(b) the characteristics of the fluid (surface tension, viscosity, etc.).

It is most preferred, especially with an easily eroded particulate cake (9), that the stream be a continuous, uniform flow, rather than a "drip". A "flow" tends to disturb the cake less than a "drip", due to less impact of the rinsing fluid. The "flow" is created by bringing the blocking wall (10) very close to the surface of the cake, preferably approximately 1/16th of an inch from the cake surface. This requires that the cake surface be smooth, which is often the case for the easily erodable, small particulates. It has been conceived that the wall must be within two inches or less from the cake surface in order to avoid undesired disturbances of easily eroded cakes. Thus, an easily eroded cake is defined as one which is eroded by droplets coming from a height more than two inches above the surface of the cake.

Figure 2B:
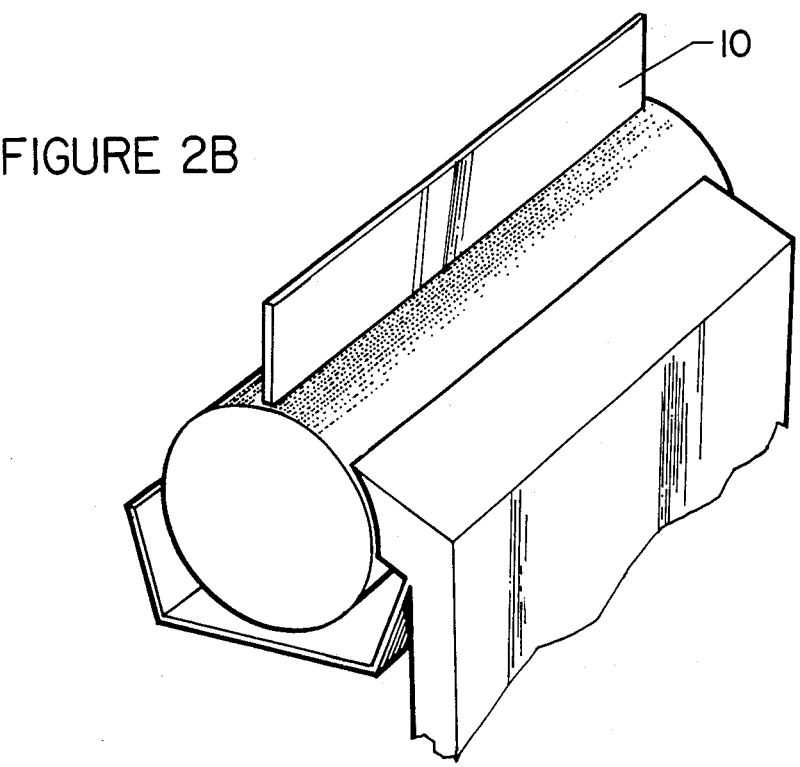
FIGS. 2A and 2B are perspective views of the filter portion shown in FIG. 1A.
Figure 2A:
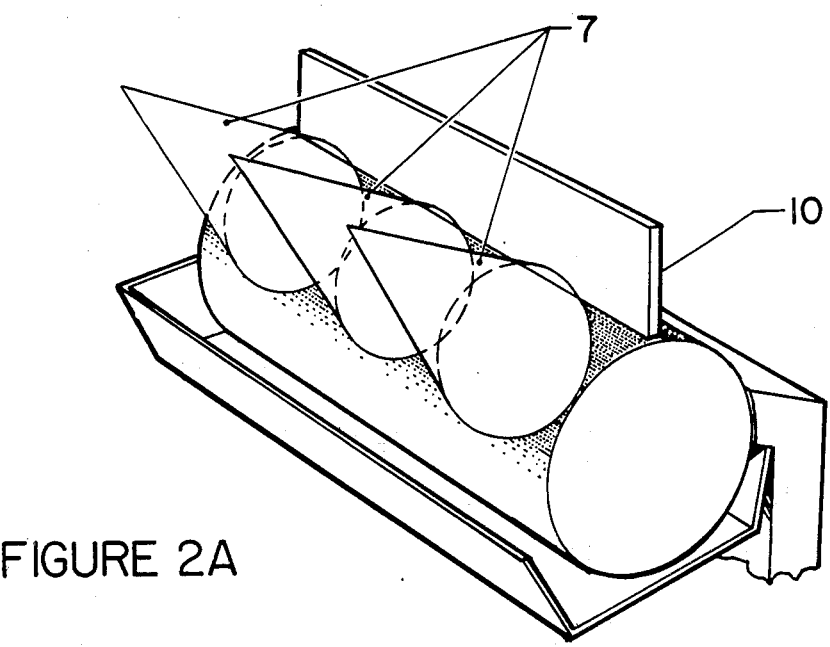

FIGS. 2A and 2B illustrate the filter of FIG. 1 in perspective views. FIGS. 2A and 2B show a continuous vertical plate (10) traveling the full length of the drum. Just as in FIGS. 1A and 1B, FIGS. 2A and 2B illustrate the wall (or plate, or "blocking means") above the "peak" of the drum, as is most preferred. It is also conceived that many filtration processes could be operated with the wall (10) located so that the flow travels onto the cake (9) as much as 10 degrees from the "peak", this region being defined as the "uppermost" portion of the filter drum. In reailty, it is conceived that many filtration processes could be carried out with the flow of blocked spray traveling onto the cake from any point which is (less than two inches) above the cake, depending upon, among other factors:

(a) the ease of erosion of the cake; and
(b) the characteristics of the fluid; and
(c) the distance of the blocking wall (10) from the cake surface; and
(d) the rate of flow of the spray; and
(e) the amount of vacuum within the drum; etc.

It has also been conceived that it would be advantageous to have vertical channels in the spray blocking wall, these vertical channels herein being called vertical corrugations.

Figure 3:
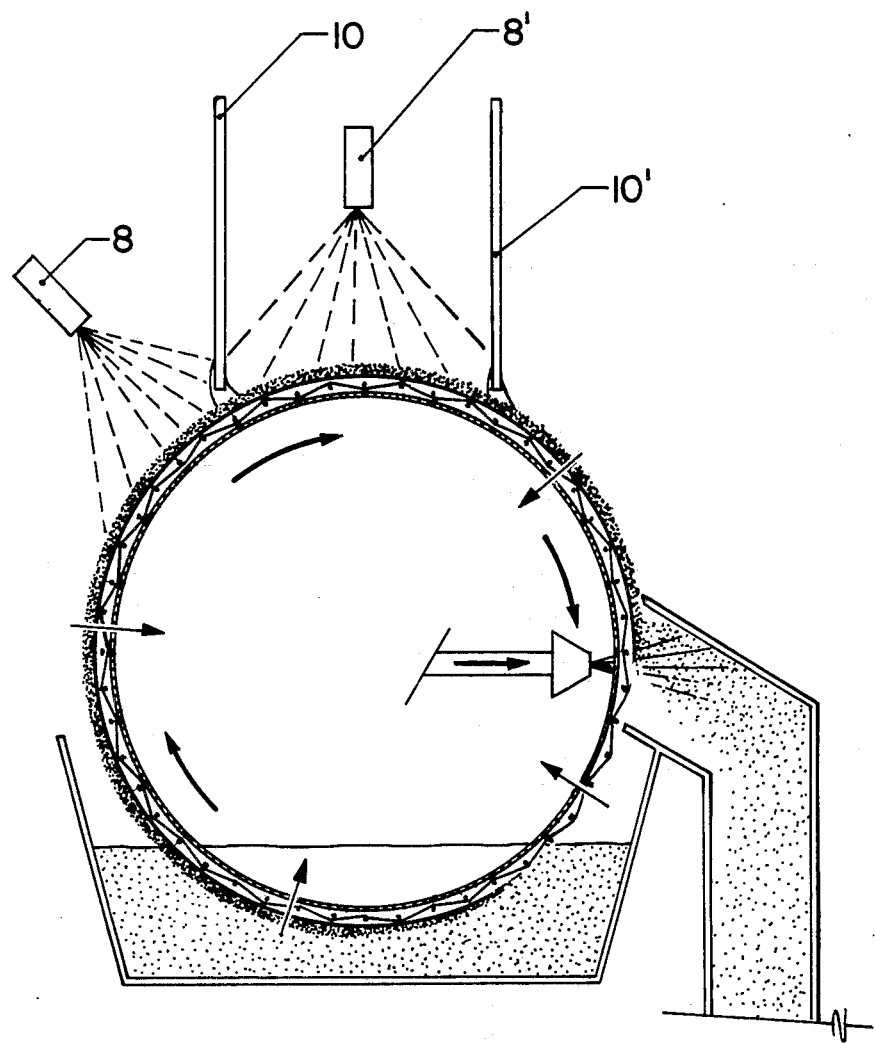
FIG. 3 is a cross-sectional frontal view of a portion of an alternative embodiment of an improved rotary drum vacuum filter of the present invention.

FIG. 3 illustrates a second embodiment of the invention. The device of FIG. 3 includes two sprayers (8 and 8¹) and two walls (10 and 10¹). As can be seen in FIG. 3, the walls can be positioned at locations other than the "peak", as more than one sprayer may be utilized at a single point along the axis of the filter. Also note that a single wall (10) can block spray on both of its major surfaces.

Design of the optimal filter for filtration of particulates that form an easily eroded cake requires a recognition of several factors which are closely related to cake erosion.

First, the drop size and flow rate emitted by the spray nozzles is critical, as flow rates too high and/or drop sizes too large will favor cakr erosion. The distance of the nozzle from the cake surface determines the "spray density" impacting the cake. The closer the spray nozzle to the cake surface, the higher the spray density, and the greater the chance for cake erosion. When using two or more sprayers, spray overlap can create greater spray density in the area of overlap, with the possibility of generating erosion. Thus care must be taken in the placement of the nozzles within the filter unit.

Secondly, the placement of the wall, i.e. the spray blocking means, affects the potential for erosion. A wall placed at the "peak" is the least likely to create erosion, whereas a wall coming closest to the drum at about "10 o'clock" is much more likely to create erosion as can be understood by considering the more rapid flow of fluid down the steep slope of that point of the filter surface. In addition, as mentioned above, the distance from the lowermost point on the wall to the cake surface determines the amount of impact of the rinse liquid on the cake, with the greater distances favoring more erosion. It has been conceived that the angle (with respect to vertical) of the plane of the wall is not critical so long as the rinse runs down onto the drum at the desired location. Of course, the amount of rinse traveling down the wall affects the erosion potential, with greater amounts of rinse again favoring greater erosion. Thus wall placement with respect to spray pattern placement must be considered. In addition, as known to those of skill in the art, and as discussed in detail in U.S. Pat. No. 4,008,154, any structure supplying rinse to the cake should distribute that rinse as evenly as possible. Thus the lowermost surface of the wall should be as close to horizontal as possible, so that rinse will not tend to run along the bottom edge of the wall, but instead will continue to travel downward upon encountering the lowermost surface of the wall.

Of course, other factors such as:

(a) pressure within the drum; and (b) affinity of particulates within the cake to one another; and (c) affinity of the particulates to the filter medium; and (d) cake thickness and permeability; and (e) surface speed of the drum; and (f) others;

affect the potential for erosion. All of these should be considered in designing and system to achieve maximum rinse efficiency with minimum erosion.

The term "suspension" has been used herein to include liquids having solid particulates dispersed therein. Although classically a suspension is meant to include only liquids having uniformly dispersed, non-settling particulates therein, the term suspension, as used herein, is meant to include mixtures of solids and liquids in which it is necessary to mechanically disperse the particulates.

The following example is intended to illustrate a preferred embodiment of carrying out the present invention and the utility of the present invention, and is in no way intended to limit the realm of applicability of the concepts described above.

EXAMPLE

A rotary drum vacuum filter was used to filter a platinum coated graphite catalyst from an acidic slurry which contained 5% graphite by weight. The liquid (4) was water. The liquid contained approximately 1.25% free sulfuric acid (by weight), and about 12% hydroxylamine sulfate. The graphite particulates varied in size, up to a maximum of about 100 microns. A 30 micron screen was used as the filter medium in order to separate out all particulates from 30–100 microns in size.

The rotary drum vacuum filter was obtained from the Bird Machine Company of South Walpole, Mass. The rotary drum had a diameter of 18 inches and a length of 24 inches. The filter unit had a motor for drum rotation, a vacuum pump for creation of vacuum within the drum, a pump for filtrate removal, and a 4-inch Pulsair Valve for particulate ejection, the Pulsair Valve being supplied with compressed air from a compressor.

The filter was operated with an internal pressure of −12 inches Hg, and the drum was rotated at 1.0 rpm. Under these conditions, the filter separated about 200 pounds per hour of graphite, which contained about 25% water on a dry weight basis.

Without rinsing the graphite, the particulates contained about 2% sulphuric acid. Application of a highly dispersed atomic water spray using 2 Bete type P 40 impingement nozzles (obtained from Bete Fog Nozzle Inc., 324 Wells Street, P.O. Box 311, Greenfield, Mass. 01302) and 3 Bete type P 48 impingement nozzles (also obtained from Bete Fog Nozzle Inc.) was done at flow rates low enough to cause no erosion of the graphite cake. This occurred at a maximum water flow of about 1.4 gallons per minute, and under these conditions 91% of the acid was rinsed off of the particulates.

The geometry of the spray pattern and the velocity of the water leaving the sprayer caused an estimated 50% of the water leaving the sprayers to fail to penetrate the graphite cake. A vertical wall was installed directly above the drum, the wall being spaced about 1/16th of an inch from the graphite cake. It was found that this wall provided a smooth, gentle flooding of the catalyst surface without erosion, and that 97.5% of the acid was removed with the wall addition, as compared to 91% acid removal without the wall. It was estimated that an approximately 4-fold increase in the amount of rinse water would be necessary to achieve this degree of acid removal without the wall, but it was kown that an increase of this magnitude would result in substantial erosion of the cake.

The spray nozzles were located at the following points within the housing surrounding the rotary filter:

(a) "Outside" nozzles were positioned three inches from each end of the drum, the nozzles being pointed at about "11 o'clock" on the screen surface as shown in FIG. 1A. These "outside" nozzles were of the Bete P40 type. These "outside" sprayers were positioned 3 inches from the screen surface.

(b) Three "inside" nozzles were positioned between the "outside" nozzles, these three inside nozzles being 4.75 inches from one another. These three inside nozzles were located on a straight line, with the middle inside nozzle being located at the midpoint along the screen length. The inside sprayers were of the "Bete P48 type". The inside sprayers were positioned five inches from the drum surface, these inside sprayers also being pointed at approximately "11 o'clock" on the screen surface.

A 27 psig water line supplied water to all five nozzles. The outer nozzles had a flow rate of 0.22 gallons per minute and the inside nozzles had a flow rate of 0.26 gallons per minute.

I claim:

1. An improved rotary drum vacuum filter for filtering material producing an easily erodable cake, the filter including a filter drum having a filter medium thereon, a means to rotate the filter drum, a means to create a vacuum within the filter drum, a means to partially submerge the filter drum within a suspension which contains particulates which are to be removed, a spray rinsing means for rinsing a particulate cake which is formed on the filter medium, and means to eject rinsed particulates from the filter medium, wherein the improvement comprises:

a means to block a portion of the spray rinse, the spray blocking means being positioned above the cake surface, the blocking means allowing rinse liquid to travel down onto the cake surface, the blocking means being separated from the cake surface, the separation being a maximum of two inches.

2. An improved filter as described in claim 1 wherein the blocking means is separated from the cake by approximately one sixteenth inch.

3. An improved filter as described in claim 1 wherein the blocking means is a continuous vertical plate.

4. An improved filter as described in claim 3 wherein continuous vertical plate has vertical corrugations therein.

5. An improved filter as described in claim 1 wherein the lowermost portion of the blocking means is positioned above an uppermost portion of the filter drum.

6. An improved filter as described in claim 1 wherein the lowermost portion of the blocking means is directly above the peak of the rotating filter drum.

7. An improved process for rinsing an easily erodable cake formed on a filter medium of a rotary drum vacuum filter, the process of rinsing the cake formed on the filter medium of the rotary drum vacuum filter partially submerged within a suspension including spray rinsing the cake formed on the filter medium, wherein the improvement comprises:

blocking a portion of the spray rinse with a spray blocking means, the blocking means being both positioned above the cake surface and separated from the cake surface, the blocking means being separated from the cake surface by a maximum of one half inch.

8. An improved process as described in claim 7 wherein the spray blocking means is so close to the cake surface that the blocked spray flows directly onto the cake surface.

9. An improved process as described in claim 8 wherein the spray blocking means is positioned above an uppermost portion of the cake.

10. An improved process as described in claim 8 wherein the spray blocking means is positioned directy above the peak of the cake.

11. An improved process as described in claim 7 wherein the spray blocking means is positioned above an uppermost portion of the cake.

12. An improved process as described in claim 7 wherein the spray blocking means is positioned directly above the peak of the cake.

13. An improved process as described in claim 7 wherein approximately 50% of the spray is blocked by the blocking means.

14. An improved process as described in claim 7 wherein water is used as a rinse liquid.

15. An improved process as described in claim 7 wherein the spray rinse is atomized.

16. An improved process as described in claim 7 wherein the particulates range in size from 30–100 microns.

* * * * *